(12) United States Patent
Jolitz et al.

(10) Patent No.: US 6,935,089 B2
(45) Date of Patent: Aug. 30, 2005

(54) METHODS OF MANUFACTURING ROOFING PRODUCTS

(75) Inventors: Randal J. Jolitz, Joplin, MO (US); Dennis Dean Carlson, McPherson, KS (US); Charles Doyle Ziulkowski, Carl Junction, MO (US)

(73) Assignee: EPOCH Composite Products, Inc., Joplin, MO (US)

( * ) Notice: Subject to any disclaimer, the term of this patent is extended or adjusted under 35 U.S.C. 154(b) by 0 days.

(21) Appl. No.: 10/387,823

(22) Filed: Mar. 12, 2003

(65) Prior Publication Data

US 2004/0177596 A1 Sep. 16, 2004

(51) Int. Cl.[7] .................................................. B65B 35/50
(52) U.S. Cl. ........................... 53/447; 53/428; 53/439; 53/447; 53/520; 53/127; 53/176
(58) Field of Search ......................... 53/428, 431, 435, 53/439, 440, 447, 449, 111 R, 520, 52.9, 127, 176; 428/324, 325, 327, 331, 413, 492, 323; 52/309.7, 309.16, 314, 555, 558, 518, 408, 309.1, 309.8

(56) References Cited

U.S. PATENT DOCUMENTS

| | | | | |
|---|---|---|---|---|
| 4,118,236 A | * | 10/1978 | Erskine | 501/144 |
| 4,128,369 A | * | 12/1978 | Kemerer et al. | 425/113 |
| 4,233,100 A | * | 11/1980 | Cunningham et al. | 156/260 |
| 4,290,248 A | * | 9/1981 | Kemerer et al. | 52/309.16 |
| 4,384,813 A | * | 5/1983 | Smith et al. | 414/788.3 |
| 4,429,794 A | * | 2/1984 | Steger et al. | 206/597 |
| 5,186,980 A | * | 2/1993 | Koschitzky | 427/187 |
| 5,258,222 A | * | 11/1993 | Crivelli | 428/323 |
| 5,886,078 A | * | 3/1999 | Sullivan et al. | 524/449 |
| 5,976,457 A | * | 11/1999 | Amaya et al. | 419/36 |
| 6,039,646 A | * | 3/2000 | Sells | 454/365 |
| 6,345,818 B1 | * | 2/2002 | Stephan et al. | 271/91 |
| 6,546,688 B1 | * | 4/2003 | Parsons | 52/518 |

* cited by examiner

*Primary Examiner*—Stephen F. Gerrity
*Assistant Examiner*—Hemant M. Desai
(74) *Attorney, Agent, or Firm*—Blackwell Sanders Peper Martin LLP

(57) ABSTRACT

Methods of making roofing products. One such method includes (a) creating a mixture having a filler and a polymer; (b) forming a sheet from the mixture; (c) cooling the sheet; (d) embossing the sheet; (e) forming multiple roofing products from the sheet; and (f) bundling at least some of the roofing products. Steps (a)–(f) are performed using an automated procedure. Another of the methods involves (a) creating composite roofing products using mold cavities; (b) using a robot to transfer some of the roofing products from some of the mold cavities to a conveying system; and (c) stacking together at least two of the roofing products that have different colors or different surface configurations.

4 Claims, 13 Drawing Sheets

METHODS OF MANUFACTURING ROOFING PRODUCTS

BACKGROUND OF THE INVENTION

1. Field of the Invention

The present invention relates to methods of manufacturing roofing products.

2. Description of Related Art

Traditional roofing products include asphalt shingles, wood shakes, slates, and metal panels. Each of these products has benefits. For instance, wood shakes and slate roofing are very aesthetic. However, wood shakes are considered a fire hazard and slate is very expensive and subject to cracking.

Less expensive roofing products have been introduced to simulate wood shakes and slate roofing. Some asphalt shingles have been developed that resemble slate or shake roofing. However, asphalt products typically do not have the structural rigidity of slate or shake. Metal and plastic shingles have been developed that simulate shake and slate. However, those products are subject to denting and breakage.

Composite roofing products, typically composed of at least a polymer and a filler component, have been developed to resemble certain of the more traditional roofing products, including shakes and slates. The manufacture of these composite roofing products has traditionally involved the use of extrusion, pressing, and/or molding techniques. An example of a process involving extrusion of roofing products composed primarily of asphalt appears in U.S. Pat. No. 5,690, 876. Examples of molding processes used in making composite roofing products include those in U.S. Pat. Nos. 6,025,052; 6,112,492; and 5,635,124. The use of both extrusion and molding is disclosed in U.S. Pat. No. 6,290,885.

Some of these patents promote economies of scale in aspects of their manufacturing. However, none discloses a manufacturing solution that takes advantages of economies of scale and may be automated from virtually beginning to end.

SUMMARY OF THE INVENTION

The present invention comprises methods for creating roofing products. Certain steps of the present methods may be automated. In one embodiment, the invention is a method of making roofing products that comprises (a) creating a mixture having a filler and a polymer; (b) forming a sheet from the mixture; (c) cooling the sheet; (d) embossing the sheet; (e) forming multiple roofing products from the sheet; and (f) bundling at least some of the roofing products. Steps (a)–(f) are performed using an automated procedure.

In another embodiment, the invention is a method of making roofing products that comprises (a) creating composite roofing products using mold cavities; (b) using a robot to transfer some of the roofing products from some of the mold cavities to a conveying system; and (c) stacking together at least two of the roofing products that have different colors or different surface configurations.

Other embodiments having additional or different steps are discussed in greater detail below.

BRIEF DESCRIPTION OF THE DRAWINGS

The following drawings demonstrate aspects of some of the present methods and layouts that may be used to carry out the present methods. They illustrate by way of example and not limitation. Like reference numbers refer to similar elements.

DESCRIPTION OF ILLUSTRATIVE EMBODIMENTS

In this document (including the claims), the terms "comprise" (and any form of comprise, such as "comprises" and "comprising"), "have" (and any form of have, such as "has" and "having"), and "include" (and any form of include, such as "includes" and "including") are open-ended linking verbs. Thus, a method "comprising" creating a mixture having a filler and a polymer; forming a sheet from the mixture; cooling the sheet; embossing the sheet; forming multiple roofing products from the sheet; and bundling at least some of the roofing products; where these steps are performed using an automated procedure, is a method that possesses the recited steps, but is not limited to possessing only the recited steps. For example, the method also covers cooling the sheet after embossing it.

Likewise, a given step in a "comprising" claim covers not only what is recited in the step, but also additional aspects that are not recited. For example, cooling the sheet covers cooling the sheet using air, and cooling the sheet using water.

The terms "a" and "an" mean one or more than one. The term "another" means at least a second or more.

Those of skill in the art will appreciate that in this detailed description, certain well known components and assembly techniques have been omitted so that the present methods are not obscured in unnecessary detail. Dimensions provided in English units may be translated to the corresponding metric unit by rounding to the nearest millimeter.

Sheet Line Methods

Figure 1:
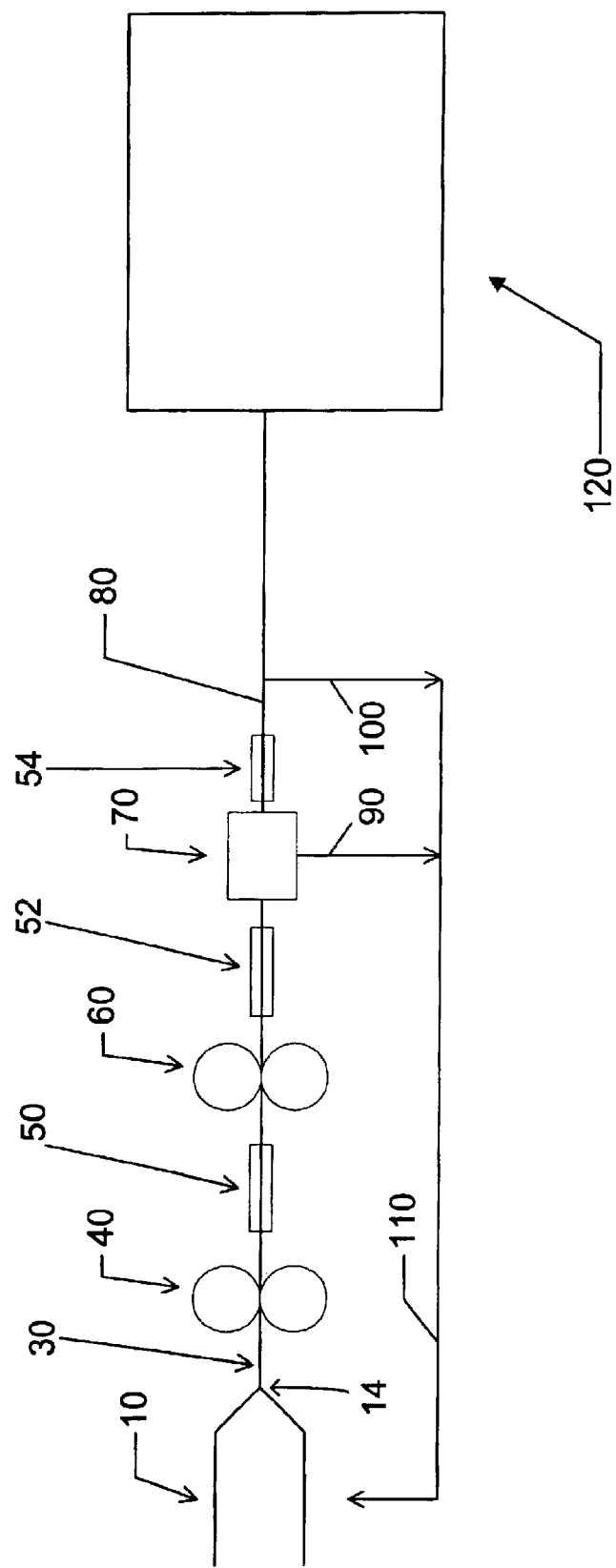
FIG. 1 is a sheet line layout that may be used to perform embodiments of steps of certain of the present methods.
Figure 3:
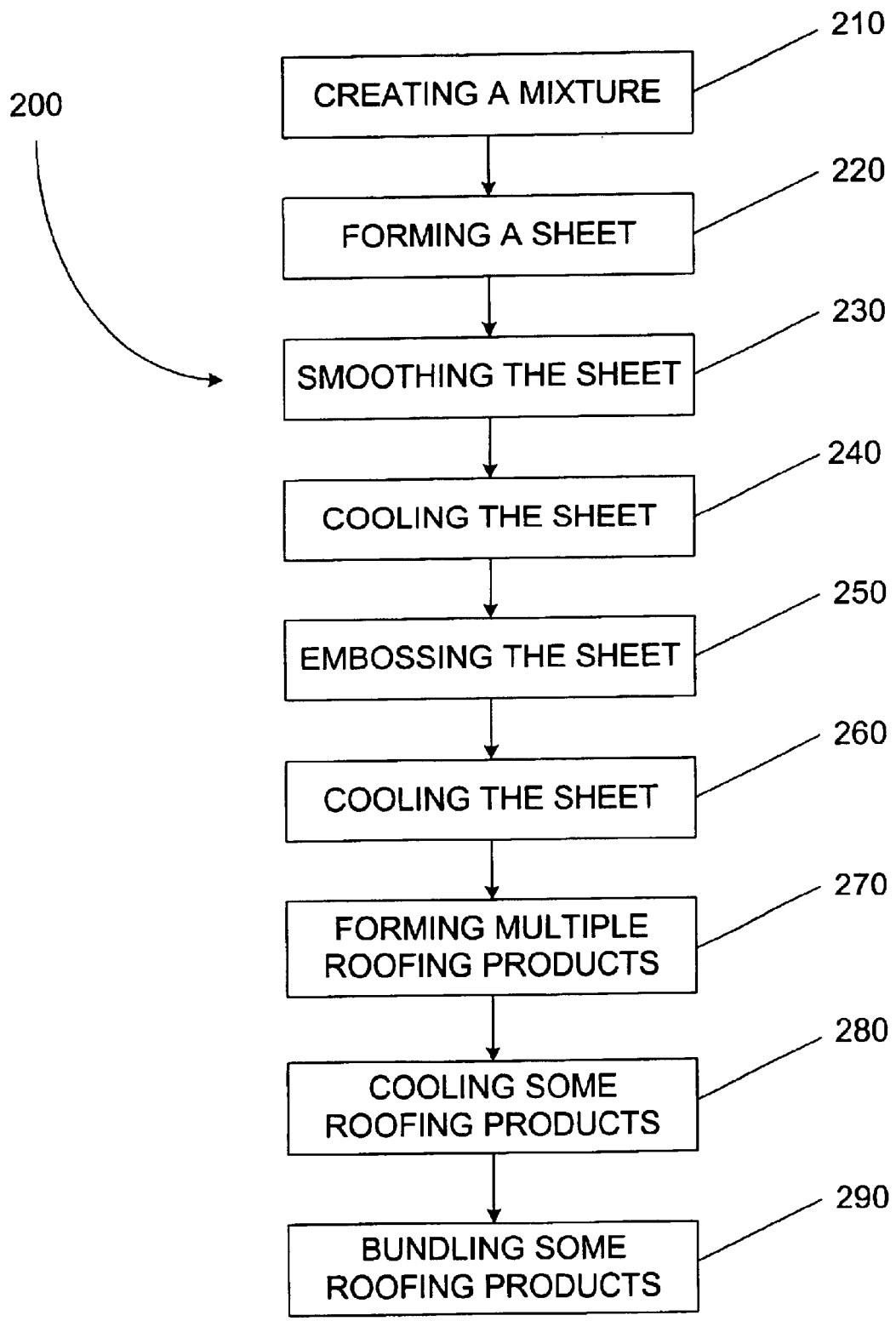
FIGS. 3–5 are flow diagrams showing steps of embodiments of the present methods for creating roofing products.

Certain of the present methods may be used in accordance with the sheet line layout shown in FIG. 1. One such method is method 200, the steps of which are illustrated in FIG. 3. Step 210 of method 200 is creating a mixture having a filler and a polymer. Step 210 may be carried out using extruder 10 shown in FIG. 1. Extruder 10 may include (e.g., be connected to) a mixer. As part of the mixture creation, the starting materials of at least a polymer and at least a filler may be fed into extruder 10. When extruder 10 also includes a mixer, the starting materials (e.g., polymer, filler, colorant, and other additives, if any) may be fed by feeders and/or material handlers into a hopper of the mixer.

Figure 2A:
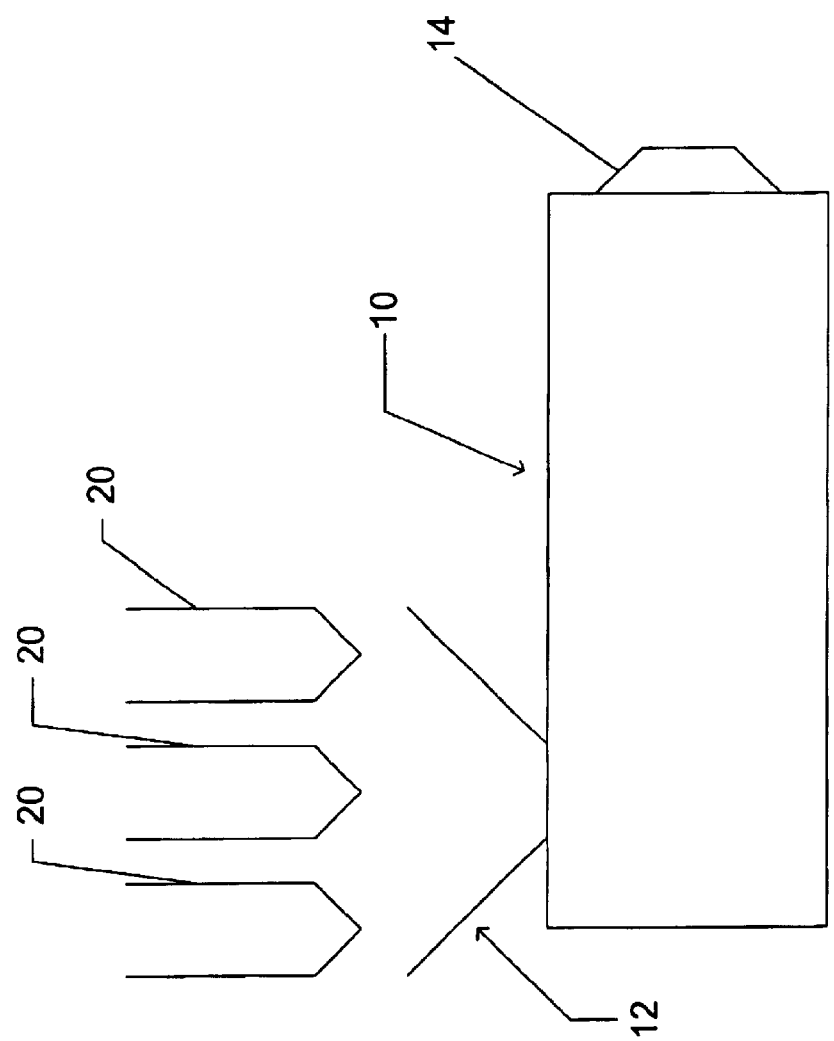
FIG. 2A shows one embodiment of a feeder/material handler and extruder combination that may be used to carry out embodiments of steps of certain of the present methods.

For example, FIG. 2A shows three feeders/material handlers 20 that may be used to feed starting materials into a hopper 12 of a mixer (unlabeled) connected to extruder 10. Although not shown as such, the feeder(s)/material handler (s) that are used consistent with the present methods may be coupled to each other in a way that allows the components of the eventual mixture (e.g., at least polymer and filler) to be mixed prior to being dumped into the hopper of the mixer (or hopper of the extruder if the extruder lacks a separate mixer), where additional mixing occurs. As used in this document, two things are "coupled" if they are connected, but not necessarily directly and not necessarily mechanically. The mixing by one or more of the feeders and/or material handlers is part of one embodiment of step 210.

Also shown in FIGS. 1 and 2 is die 14, which may be a sheet die. Step 220 of method 200 is forming a sheet by extruding the mixture through a die. This step may be accomplished using extruder 10 and die 14 shown in FIGS. 1 and 2.

Examples of starting materials for the mixture include polyethylene and limestone. The polyethylene may be high- or low-density polyethylene, and may be virgin or recycled. The limestone may be crushed limestone. A colorant may also be used as a starting material, as may other materials such as UV-protectors, and fire retardants. The starting materials may be fed at ambient temperature into extruder 10. Alternatively, the starting materials may be fed at ambient temperature into feeders/material handlers 20. Feeders/ material handlers 20 may then work together to mix the starting materials together, heating them to some extent (but not necessarily to a molten state) prior to dumping them into extruder 10 or, in some cases, hopper 12 of a mixer connected to extruder 10.

Suitable extruders for use with certain of the present methods include hot-feed (i.e., the starting materials enter the extruder in a state heated above ambient) and cold-feed (i.e., the starting materials enter the extruder at ambient). Suitable extruders also include screw-type extruders, such as single-screw or double-screw extruders (more screws than two may be used). When no mixer is attached to extruder 10 in carrying out step 210, an extruder with a screw designed to mix the starting materials to create the mixture may be used. Alternatively, where a mixer is used in creating the mixture, the extruder may include only a feedscrew that is designed to pump the mixture and not contribute to the creation of the mixture.

One example of a suitable extruder for use with the present methods is Farrel's CP2500 continuous mixer (Ansonia, Conn.), which includes an externally-heated continuous mixer on the front end and an externally-heated extruder on the back end. One way of carrying out step 210 involves the use of the CP2500. More specifically, in creating the mixture, the starting materials may be compounded within the mixing chamber barrel of the CP2500. The compounding may include heating the polymer until it reaches a molten state. The heating may be achieved using the externally-heated mixing chamber barrel, and through the friction between the rotors of the mixer, the mixture itself, and the inside of the barrel. As a result of the heating, the polymer may encapsulate some or all of the filler. The temperature of the mixture at this point may be 325 to 600° Fahrenheit (F.).

Continuing with this example of creating a mixture (step 210), the heated barrel of the mixer is controllable. A maximum temperature may be set, and if the mixture exceeds that temperature, the external heater will trip off. A minimum temperature may also be set, and if the mixture falls or starts off at or below that temperature, the external heater of the mixing chamber barrel will turn on. However, the external heater of the barrel will always be operating (although it may be tripped off under the appropriate circumstances).

After creating the, step 220 of forming a sheet by extruding the mixture through a die, such as a sheet die, may be performed. In FIG. 1, the die is shown generically as a point 14 on the end of extruder 10. In FIG. 2A, die 14 is more visible. In carrying out step 220, extruder 10 may force the mixture through the die to form a sheet that then begins to travel along a conveyor, such as conveyor belt 30. The temperature of the sheet after exiting the die may be 225 to 500° F.

When using the CP2500, the mixture will be fed from the mixer barrel to the extruder barrel through an enclosed connecting chute. The CP2500 is equipped with a pneumatically-operated pusher assembly for the extruder hopper that allows the mixture to be crammer-fed into the extruder barrel. The hopper of the extruder is externally heated, as is the barrel of the extruder.

The extruder of the CP2500 has a feedscrew that is designed to pump only. Use of the feedscrew will raise the temperature of the mixture minimally, if at all, although the external heaters on the extruder hopper and barrel may function to keep the mixture in a molten state to facilitate formation of a sheet by extrusion.

One example of a die 14 that may be used for carrying out step 220 is a 28-inch Masterslide HD sheet die available from Battenfeld Gloucester Engineering (Gloucester, Mass.). This die may be dimensioned to create a sheet that is approximately ¼ inch thick by 26 inches wide. Other sheets of other desired dimensions may be created using different dies. In carrying out step 220, a sheet may be formed by forcing the mixture through this die using the feedscrew of the extruder of the CP2500.

The sheet that is formed by step 220 may be conveyed along conveyor belt 30 to calender rolls 40, oriented one above the other. Alternatively, extruder 10 and die 14 may be positioned sufficiently close to calender rolls 40 that conveyor belt 30 is not used. Step 230, which is smoothing the sheet, may be accomplished by passing the sheet through calender rolls 40. Conveyor belt 30 may be driven automatically. In addition to smoothing the sheet, the calender rolls may also reduce the thickness of the sheet, depending on the nip (i.e., the distance between the surfaces of the rolls) setting. The calender rolls may be stationary and unconnected to conveyor belt 30. Alternatively, calender rolls 40 may be coupled by a movable station to conveyor belt 30, such that the position of the calender rolls may be varied along a continuous section of conveyor belt 30. After smoothing the sheet by passing it through calender rolls, the temperature of the sheet may be 175 to 300° F.

One example of a pair of calender rolls suitable for use as calender rolls 40 is a 24-inch by 32-inch Model 2000 ST Hydraulic 2-roll stack available from Battenfeld Gloucester Engineering (Gloucester, Mass.). The stack is equipped with electrically-powered heating and cooling elements that allow the calender rolls to be heated or cooled as desired.

Continuing with method 200, after the sheet is smoothed, the sheet may proceed along conveyor belt 30 to embossing station 60, which may be designed to impart features to the sheet for the purpose of ultimately creating roofing products shaped like or having the appearance of shakes, slate, or tile. As the sheet passes to embossing station 60 along conveyor belt 30, step 240 of cooling the sheet (e.g., some or all of the sheet) may be carried out using cooling station 50. Cooling station 50 may comprise a cooling conveyor (also described as a cooling conveyor section) from EMI Plastics Equipment (Wickliffe, Ohio). One such EMI cooling conveyor is Model No. RM-30-10-70, which may be used in a 10-foot section.

Alternatively, cooling station 50 may comprise an apparatus configured to reduce the temperature of a portion of the sheet, such as a mister, which may comprise an apparatus that has multiple nozzles. When a mister is used, water mist may be sprayed out of the one or more nozzles onto the sheet below. A drip pan may be positioned beneath the relevant portion of conveyor belt 30 to catch the water as it runs off the sheet and the conveyor belt. The water from the drip pan or pans may be channeled automatically to a single cooler or multiple coolers, and recycled to the nozzles of that mister.

As another alternative, cooling station 50 may comprise the combination of a conveyor, such as a cooling conveyor, and an apparatus configured to reduce the temperature of a portion of the sheet, such as a mister.

After step 240, the temperature of the sheet may be 150 to 250° F. The sheet traveling along conveyor belt 30 in FIG. 1 may then be embossed (step 250) using embossing station 60, which may comprise one or two rolls. Like calender rolls 40 (sometimes referred to as a "calender stack" in the art), embossing station 60 may be separate from and not movable along conveyor belt 30; or embossing station 60 may be coupled to the conveyor such that the position of embossing station 60 may be varied along a continuous section of conveyor belt 30. Embossing station 60 may comprise two rolls, either or both of which may serve to emboss a portion of the sheet contacted. For example, where two rolls are used as shown in FIG. 1, the top roll in the embossing station may have a textured surface that gives the top of the sheet features that simulate either wood, slate, or shake. The bottom roll may be smooth or textured. As another example, the bottom roll may be provided with a surface that is smooth except for being configured to mark information on the sheet such as the date, company name, style of roofing product, or one or more of the like.

The roll or rolls of embossing station 60 may be equipped with electrically-powered heating and cooling elements that allow them to be heated or cooled as desired. An embossing station suitable for use as embossing station 60 is a BF Perkins 2 roll face embossing machine (Rochester, N.Y.). After step 250, the temperature of the sheet may be 130 to 220° F.

After step 250 of embossing the sheet, the sheet may be cooled again (step 260) using, for example, another cooling station. Cooling station 52 depicted in FIG. 1 may be used to carry out this cooling (step 260), and may be configured in the same way as cooling station 50 described above. That is, cooling station 52 may comprise a cooling conveyor (e.g., a cooling conveyor section), an apparatus configured to reduce the temperature of the sheet (e.g., a mister), or at least both. They type of mister and the type of cooling conveyor described above may be used.

Alternatively, cooling station 52 may comprise two apparatuses configured to reduce the temperature of the sheet, the two apparatuses being placed side by side. The same type of mister described above may be used for each of these two apparatuses in this example.

As another alternative, cooling station 52 may comprise two cooling conveyor sections. The same type of cooling conveyor described above may be used in this example (e.g., two 10-foot sections).

As still another alternative, cooling station 52 may comprise two cooling conveyors, each coupled to an apparatus configured to reduce the temperature of the sheet, such as a mister. Again, the type of mister and the type of cooling conveyor described above may be used for this version of cooling station 52.

After step 260, the temperature of the sheet may be 100 to 200° F.

To the extent that water is used with cooling stations 50, 52, and 54 (discussed below), the cooling stations may be coupled to each other in a way that allows for water used in the cooling to be recycled. For example, each mister used may be coupled together and the water collected in the drip pan or pans beneath each may be directed to a common cooler or coolers that include a heat exchanger. Further, such water use may be closed (i.e., new water is not added after a certain point) or open (new water is added at regular intervals). One or more cooling conveyors may be used for cooling station 52 that do not involve the use of water. Such an embodiment of cooling station 52 allows the sheet to cool in the ambient air.

After step 260 of cooling the sheet (e.g., using cooling station 52), step 270 of forming multiple roofing products from the sheet may be carried out using, e.g., cutter 70 to cut the sheet. Cutter 70 may be configured as a roll, the outer surface of which is provided with a series of knives arranged to cut multiple roofing products across the width of the sheet. The outer surface of such a roll may also be provided with knives that cut multiple roofing products along a given length of the sheet. An example of a cutter 70 that may be used in forming multiple roofing products is the Compact Model Web-Fed Soft Anvil Rotary Die Cutter, available from CORFINE in Dayton, Ohio. Such a cutter uses a cutting roll and a die. After step 270, the temperature of the roofing products may be 80 to 180° F.

Next, step 280 of cooling at least some of those roofing products (possibly all of them) may be carried out. Such cooling may take place, for example, using cooling station 54. Cooling station 54 may be comprise one or more cooling conveyors, such as forty feet (four, 10-foot sections) of cooling conveyors. The EMI cooling conveyors described above may be used in this regard. Alternatively, as with the other cooling stations, apparatuses configured to reduce the temperature of the sheet—such as misters—may be used with regular conveyors. One or more such apparatuses may be used in this regard, and the misters described above may be used as the apparatus(es). After step 280, the cooled roofing products may be 70 to 175° F.

The position of the finished roofing products is shown as element 80 in FIG. 1.

Figure 4:
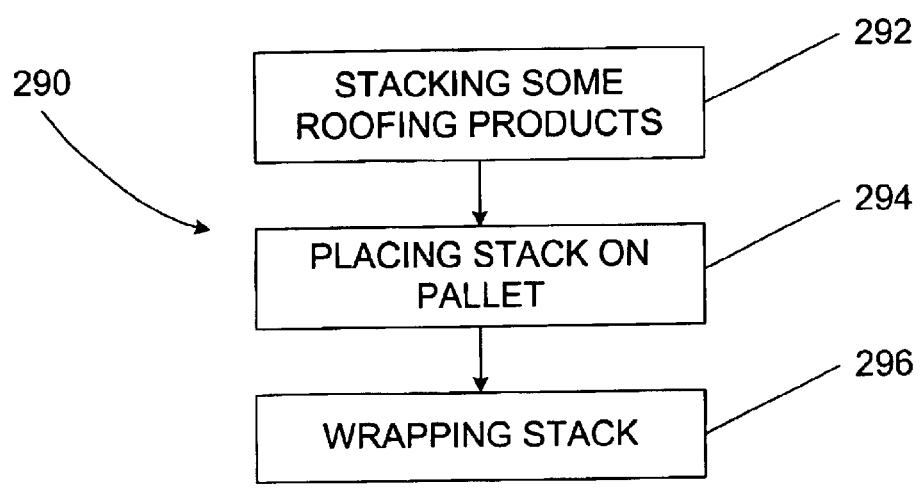

After cooling at least some of the roofing products (which may be all of them) according to step 280, step 290 of bundling at least some of the roofing products (which may be all of them) may occur at station 120 shown in FIG. 1. As shown in FIG. 4, one embodiment of the bundling of step 290 involves stacking some of the roofing products to form a stack (step 292), placing the stack on a pallet (step 294), and wrapping the stack (step 296). The stacking, placing, and wrapping steps may be accomplished using an automated procedure. This means that the procedure is designed to accomplish the stacking, placing, and wrapping without human intervention, although human intervention may be used at times to address malfunctions or to manually override the automation.

Figure 2B:
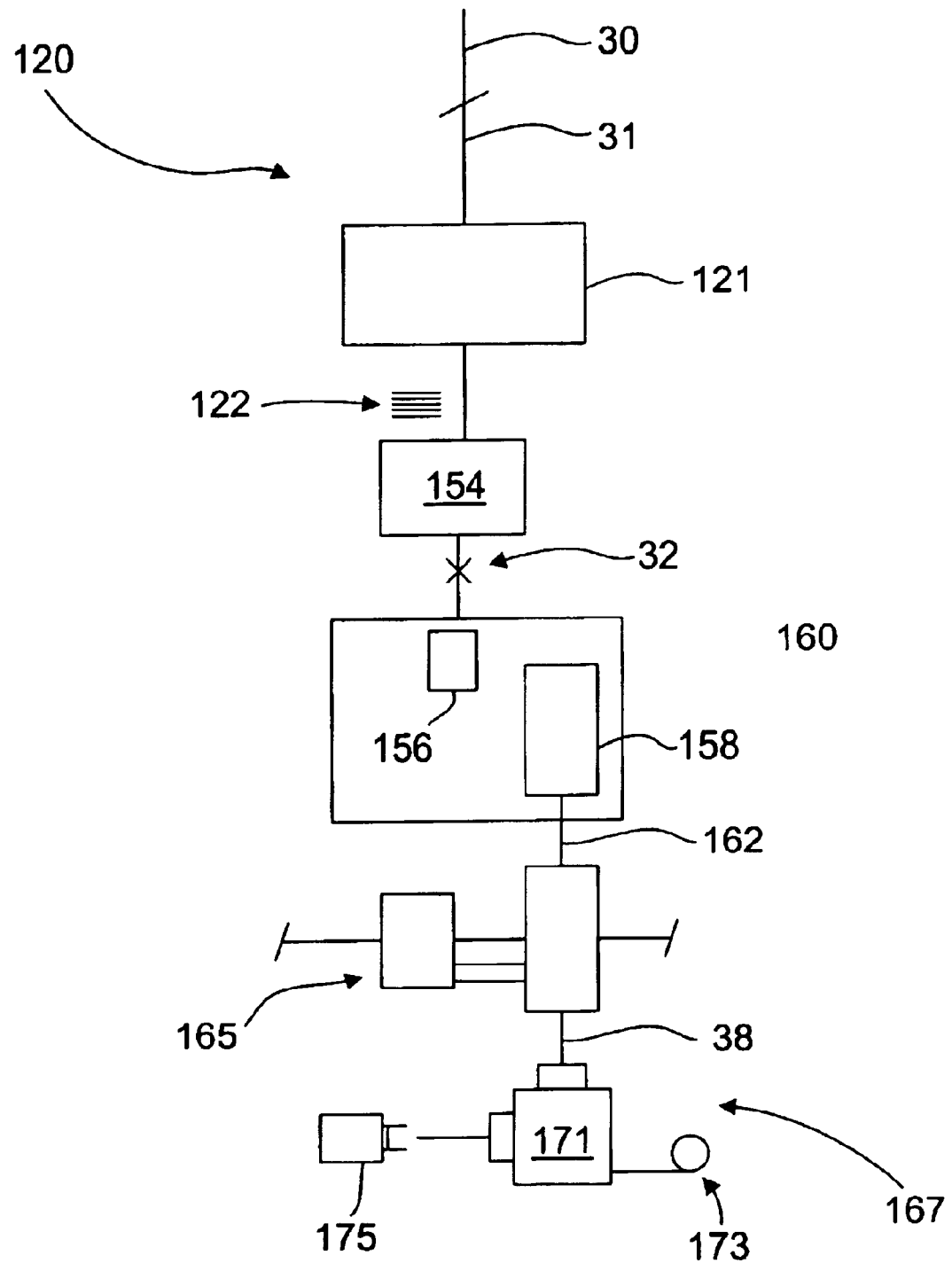
FIG. 2B is a layout showing one set of equipment that may be used to perform embodiments of the bundling step of certain of the present methods.

FIG. 2B illustrates a layout of the equipment (represented by block diagrams) that may be used to carry out one embodiment of steps 292–296. As FIG. 2B shows, conveyor 30 may be linked to a variable speed conveyor 31 (e.g., available from Van Pak Corporation, Maryland Heights, Mo.). Variable speed conveyor 31 carries the roofing products to a robot 121 that is configured to stack the roofing products into stacks 122. Robot 121, therefore, may be configured to carry out step 292. The speed of variable speed conveyor 31 may be set with respect to the speed of conveyor 30 so as to create space between the parts as they are delivered to robot 121. An example of a robot suitable for use as robot 121 is ABB's Industrial Robot IRB140 (available from ABB in Vasteras, Sweden).

Robot 121 is configured to place stacks 122 in the loading queue of strapper 154. Strapper 154 may be configured to place one or more straps around stack 122. Using straps helps ensure that the roofing products become and remain aligned with each other. For example, strapper 154 may be configured to strap stack 122 across the width of the roofing products. The strapped stack may then be ejected from strapper 154 onto a conveyor 32 equipped with a turning cross (represented by an "X") (such a conveyor is also available from the Van Pack Corporation). Conveyor 32 may be configured to rotate a strapped stack 90 degrees and return the rotated stack to strapper 154 to be strapped again (e.g., across the length of the roofing products). A suitable strapper for use as strapper 154 is an EAM Mosca Model TR3C 700/550 in-line strapping machine (available from EAM-Mosca Corporation, West Hazleton, Pa.). Such a strapping machine may be altered from its stock condition to include guides and stops configured so as to position the stacks in the proper location for the strapping to take place.

Alternatively, conveyor 32 may be configured to advance the strapped stack 122 to a palletizer 160. Queuing stations 156 may be provided as a part of conveyors 32 or as part of palletizer 160. These queuing stations are configured to queue strapped stacks 122 prior to the palletizing of the stacks.

An example of a suitable palletizer for use as palletizer 160 is the Series 2000 Gantry Palletizer available from the Van Pak Corporation.

Palletizer 160 may be equipped with one or more loading stations 158 for stacking bundles (e.g., strapped stacks 122) on one or more pallets, which may be made of wood. This process may be used to accomplish step 294 of placing a stack on a pallet. Palletizer 160 may be equipped with a gantry-style robot to pick up an incoming bundle with vacuum cups and deliver it to a pallet on the loading station 158. The robot may be configured to place bundles on a pallet in multiple orientations to best ensure that the pallet is mechanically stable. For example, the robot may be configured to rotate a bundle placed on top of another bundle by 90°.

Once a pallet has been loaded with bundles (e.g., a given pallet on palletizer 160 may be configured to hold 10 rows of bundles, and each row may include 6 bundles), the loaded pallet may be ejected from the loading station by a powered chain conveyor 162 (available from the Van Pak Corporation) and delivered by a shuttle conveyor and dual conveyor shuttle car system 165, which are available from the Van Pak Corporation. Shuttle conveyor and dual conveyor shuttle car system 165 may be configured to accept loaded pallets from palletizer 160 and deliver them to wrapping station 167. The process for this transfer of the loaded pallets from the palletizer to the wrapping station involves the dual shuttle car shifting on its shuttle conveyor to align with the loading station that is ready to deliver a loaded pallet, accepting that loaded pallet, and then shifting along its shuttle conveyor to align with power chain conveyor 38, which communicates with wrapping station 167. Empty pallets may be loaded into one or more pallet dispensers 169, which can then transfer the empty pallets back to one or more loading stations 158 for use by palletizer 160.

The wrapping step (296) of the present sheet line methods may be carried out at, for example, wrapping station 167, which may include a stretch wrapper 171, such as the model FA-66 Orion Automatic Stretch Wrapping Machine having a heat seal option (available from Orion Packaging Systems, Inc. in Collierville, Tenn.). Wrapping film made be fed to stretch wrapper 171 from its supply wheel 173. Loaded pallets are then wrapped (e.g., stretch wrapped) using stretch wrapper 171. The wrapped pallet may then be ejected onto a powered chain conveyor (available from the Van Pak Corporation) and queued. A lift truck 175 may then take the wrapped pallet to storage.

Figure 5:
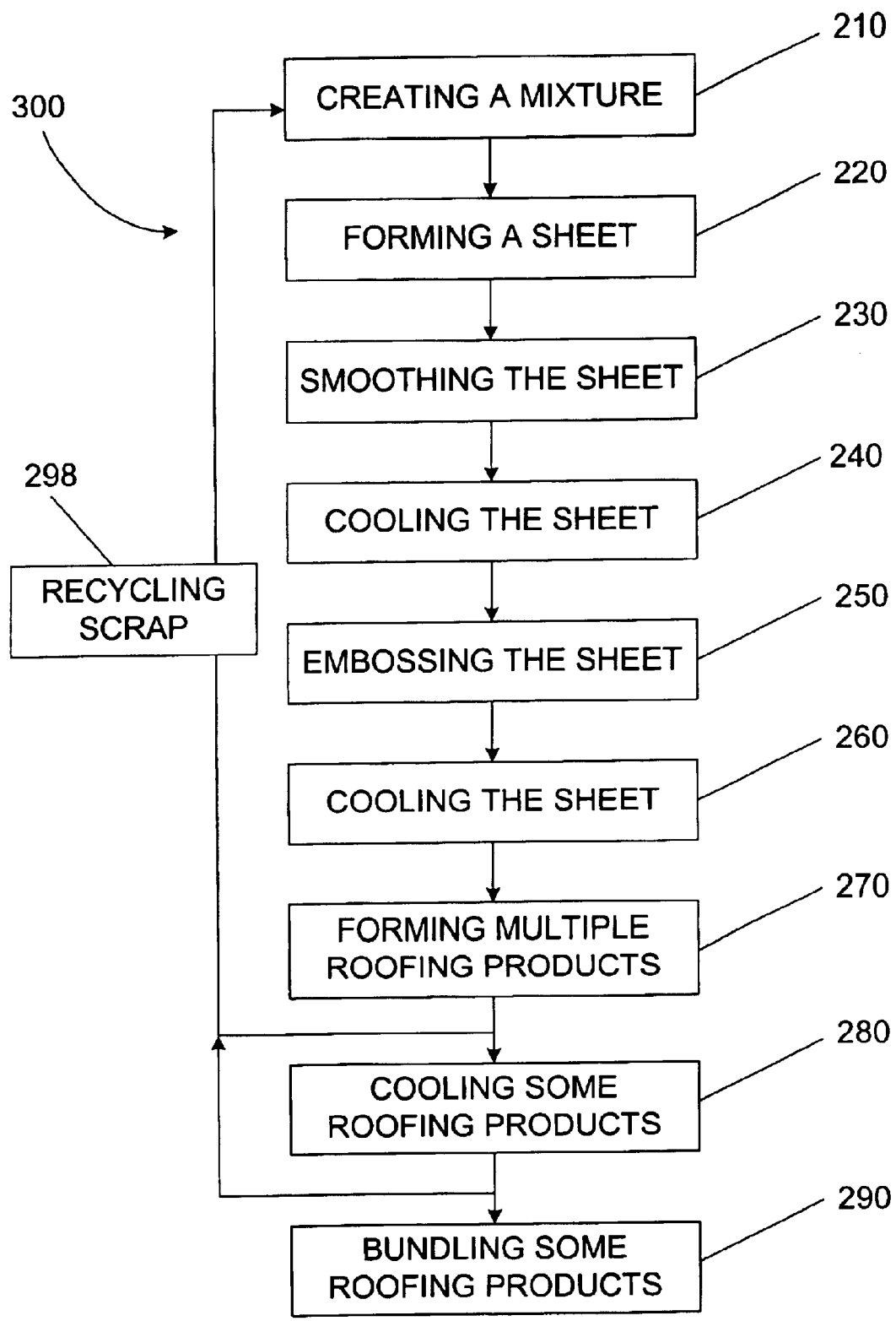

As shown in FIG. 5 with method 300, step 298, which is recycling scrap from the cutting of step 270, may be carried out by collecting scrap from the sheet and routing them back to extruder 10 along another conveyor (not shown in FIG. 1). The scrap may then be placed back into extruder 10. This recycling may start at one or more locations along conveyor belt 30 (see also FIG. 5). For example, FIG. 1 shows that scrap may be taken at points 90 (at cutter 70) and 100 (beyond cooling station 54), and routed back to extruder 10 as indicated by arrow 110. One way in which this recycling may be achieved at point 90 involves scrap material falling away from conveyor 30 after the sheet is cut to another, underlying conveyor. The underlying conveyor (not shown) may then route the scrap to a grinder, also not shown (e.g., a Rapid Granulator Model R-36, available from Rapid Granulator, Inc. in Rockford, Ill.). The grinder then grinds the scrap material to a desired state. Next, the ground scrap may be conveyed to a storage bin for use at an appropriate future time. At the desired time, which may be preset as part of an automated process, the ground material may be transported from the bin to a feeder, such as feeder/material handler 20 shown in FIG. 2A, for re-introduction into mixer 10. This transportation may take place in any suitable way, including, for example, by a vacuum connecting the bin to the feeder.

Some or all of the steps of methods 200 and 300 may be performed using an automated procedure. This means that the steps performed in this manner are designed to be accomplished without human intervention, although human intervention may be used at times to address malfunctions or to manually override the automation. Step 210 of creating a mixture having a filler and a polymer will, when using an automated procedure, be understood not to exclude steps that involve human intervention to place starting materials in the appropriate locations from which the remainder of the creating can occur.

Injection Molding Methods

Figure 6:
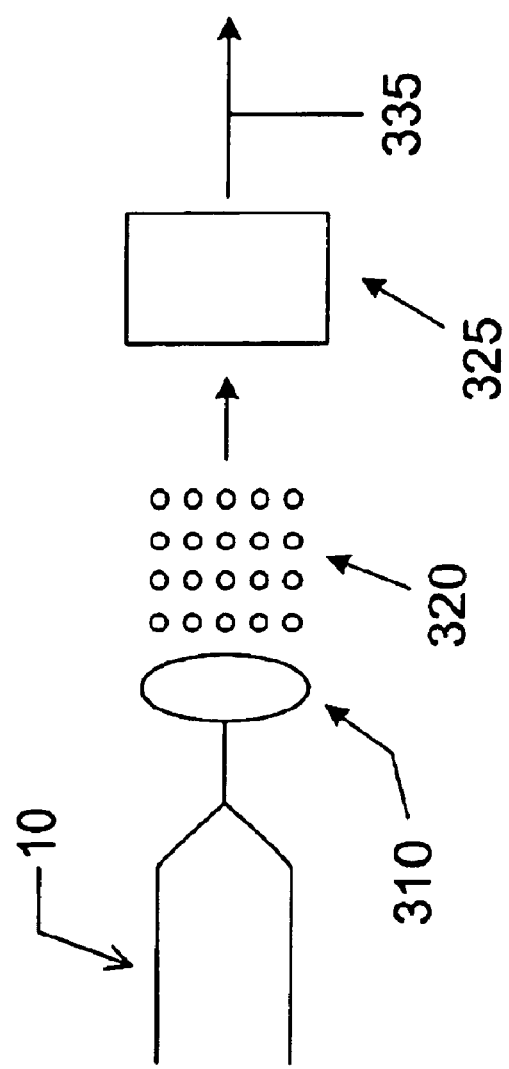
FIG. 6 is a layout showing one set of equipment that may be used to perform certain extrusion-related steps of certain of the present methods.
Figure 7:
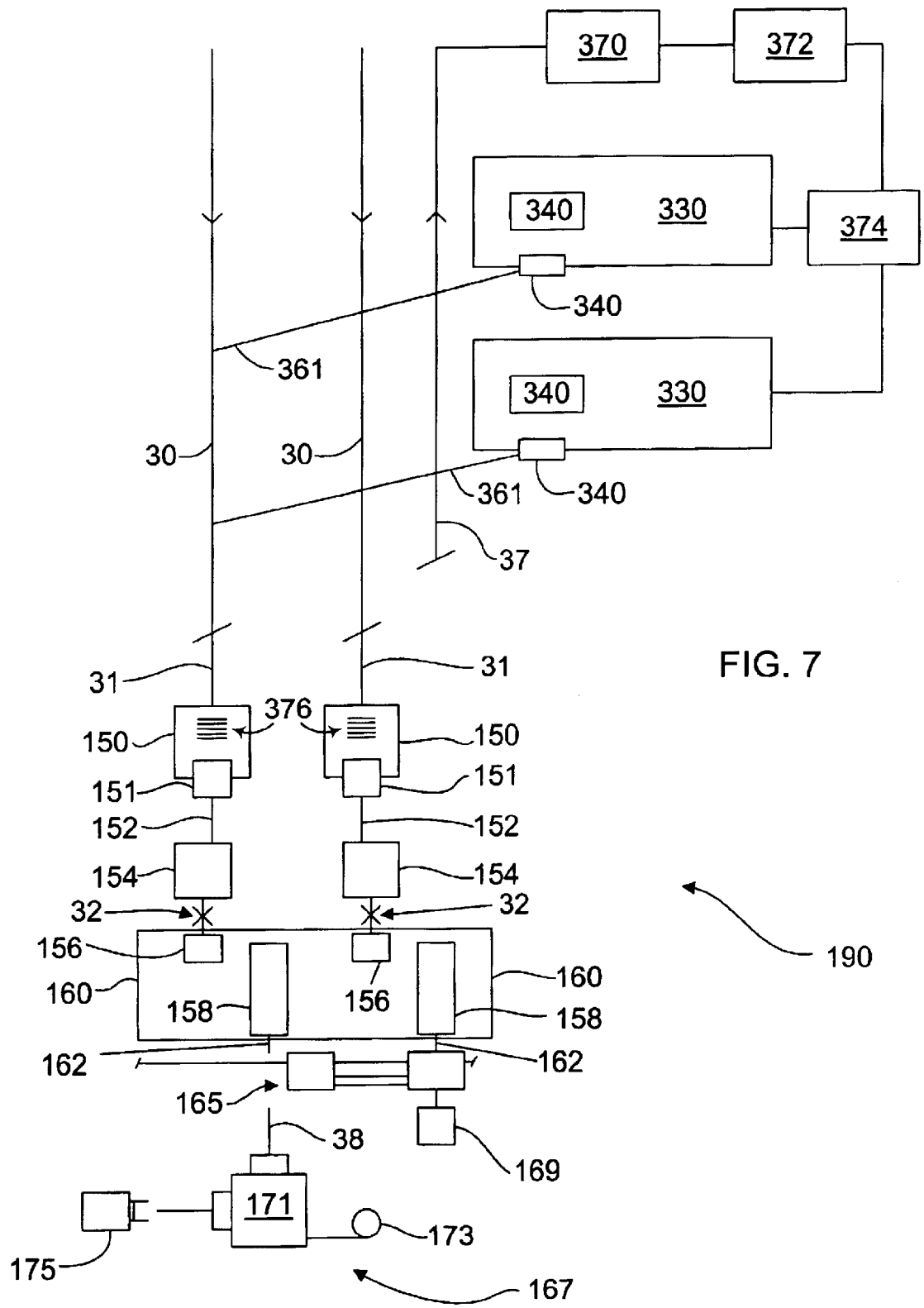
FIG. 7 is an injection molding layout that may be used to perform embodiments of steps of certain of the present methods.
Figure 8:
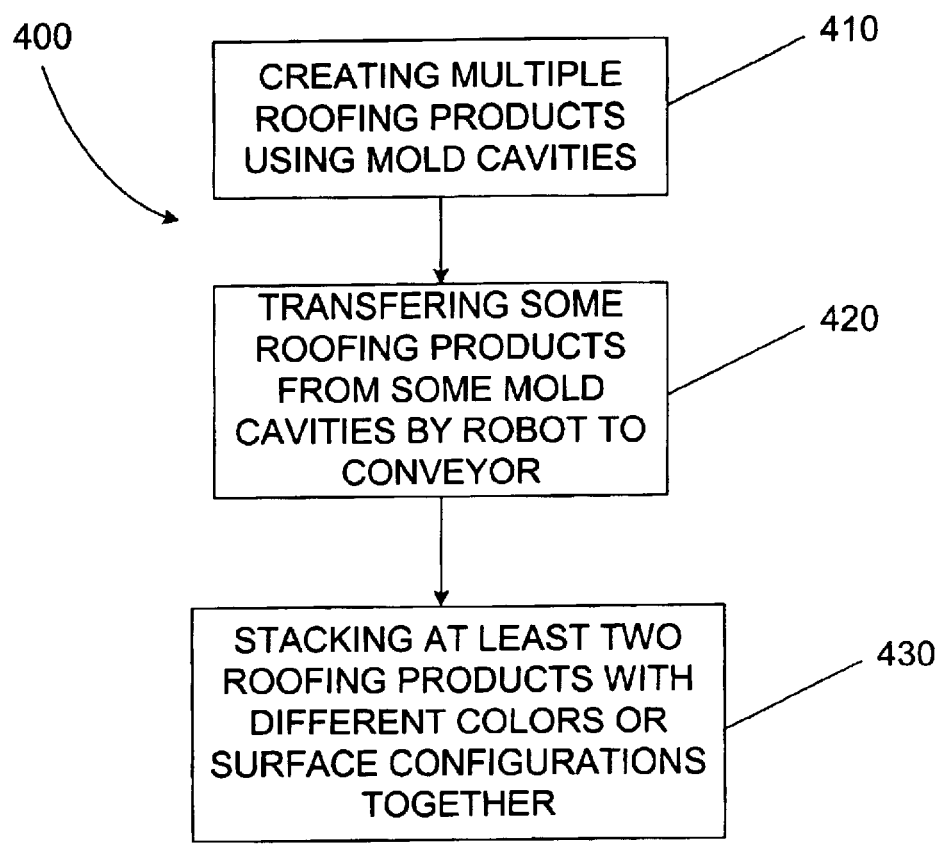
FIGS. 8, 9A–9C, and 10 are flow diagrams showing steps of embodiments of the present methods for creating roofing products.

Certain of the present methods may be used in accordance with the injection molding-related layouts shown in FIGS. 6 and 7. One such method is method 400, the steps of which are illustrated in FIG. 8. Step 410 of method 400 is creating multiple roofing products using mold cavities. The term mold cavities does not include what are known in the art as dies. Carrying out step 410 may be achieved in a variety of ways.

One way involves use of the pelletizing layout shown in FIG. 6. Extruder 10, which may be, in one embodiment, the CP2500 discussed above, may be used to create a mixture having a polymer and a filler (such as the polymer and filler discussed above) in the manner discussed above. The mixture may then be pushed through pelletizer 310 (FIG. 6) and cut using pelletizer 310 to form pellets 320. This process of creating pellets may be referred to as pelletizing the mixture. A suitable pelletizer is a Gala Industries, Inc. underwater pelletizer model MAP-7 (Eagle Rock, Va.). This pelletizer may be attached to the end of extruder 10.

The size of pellets 320 created using pelletizer 210 may be between about 0.110 and 0.150 inches in diameter. Other diameters may be more suitable for other applications. The temperature of the mixture going into the pelletizer may be about 350 to 400° F. The temperature of the resulting pellets maybe about 100 to 150° F.

As shown in FIG. 6, pellets 320 may then be dried using dryer 325. Dryer 325 is useful where pellets 320 have been created using an underwater pelletizer, such as the Gala pelletizer discussed above. However, where pellets 320 are not created using a liquid in any way, dryer 325 may not be used. When the pellets are finished drying, their temperature may be about 80 to 150° F. A suitable dryer for use as dryer 325 is the Gala Centrifugal Pellt Dryer Model 16.3 BF ECLN, available from Gala Industries, Inc. After drying, pellets 320 may be routed to storage, as indicated by arrow 335.

Pellets 320 may be taken from storage, or routed directly from dryer 325, and placed in one or more injection molders 330 shown in FIG. 7 in continuing this exemplary process of carrying out step 410. Each injection molder 330 that is used may include a mixing barrel designed to raise mix the pellets and raise the temperature of the pellet material (e.g., the mixture referenced above) to a molten state, or 350 to 500° F. Each injection molder 330 that is used may include a single-screw with a barrel that is externally heated to do this. The heating of the pellets may occur by the external heater of such a barrel, and by the friction created between the screw rotor, the pellet material, and the inside of the screw barrel. If a colorant is used, it may be added during the mixing of the pellet material in a given injection molder 330.

FIG. 7 shows two injection molders 330 being used. It should be understood, however, that as few as one injection molders may be utilized consistent with the present methods, provided the injection molder includes a mold having two or more cavities. Further, as many injection molders 330 as desired may also be used—such as 15, for example. Colorant may be added using a volumetric or gravimetric color feeder, such as the Thoresen McCosh WSB-260T (available from Thoreson McCosh in Troy, Mich.), that is coupled to one or more of the injection molders 330. An injection molder suitable for use as one of these injection molders is the Van Dorn HT Model 500 injection molder (Van Dorn Demag Corporation, Strongsville, Ohio).

Continuing with a description of how one injection molder 330 works (with the understanding that multiple injection molders may be used and that this description applies to as many as are used), from injection molder 330, the mixture will be heated and injected into the mold cavities 340. If only one injection molder 330 is used, multiple mold cavities 340 (e.g., two, three, or more) should be used consistent with the present methods. If multiple injection molders 330 are used, each injection molder may have as few as one mold cavity 340, although two, three, or more mold cavities 340 may be used in each of the multiple injection molders. Throughout this disclosure, however, a single block 340 in each injection molder 330 represents one or more mold cavities, and this description will sometimes discuss the operation and use of a single mold cavity 340 in explaining the present methods.

Mold cavity 340 may be cast or machined to have one or more surfaces configured to resemble shakes, slates, or tiles. Mold cavity 340 may be made in two, three, or more pieces, and made be made of metal, such as P20. Mold cavity 340 may be machined to have a surface or surfaces formed using digitized modeling. The digitized model may be of the target roofing product, such as a shake, slate, or tile. Each mold cavity 340 may be configured to produce a separate roofing product.

As part of step 410, the roofing products created using mold cavities 340 may be cooled by running water or another suitable coolant through the mold cavities. This type of cooling may serve to restrict the flow of the mixture into the mold cavity. The amount of mixture to be placed in each mold cavity may be determined by weight or volume, which is determined substantially by the desired size and shape of each individual part.

After step 410, and after the roofing products in mold cavities 340 have been sufficiently cooled, such as down to 70 to 170° F., step 420 may take place. Step 420 is transferring some of the roofing products from some of the mold cavities to a conveyor or to multiple conveyors, such as conveyor belts 30 in FIG. 7, using one or more robots, such as robots 360. Each robot 360 may be positioned about the clamp (not shown) of an injection molder 330. Once the molding process is complete and the product is ready to be removed from the mold cavities, the clamp of injection molder 330 will open and robot 360 will remove the finished part or parts from the mold cavity or cavities. Robot 360 may then move along a beam 361 that allows it to translate between injection molder 330 and conveyor 30. Robot 360 may place the part on conveyor 30, where it will travel to a packaging area. As shown in FIG. 7, beams 361 may be configured to allow the robot of each injection molder to access either conveyor 30. Examples of suitable conveyor belts for use as conveyors 30 in FIG. 7 are TEC's Classic Steel Horizontal Conveyors (available from TEC Engineering, Oxford, Mass.).

Figure 10:
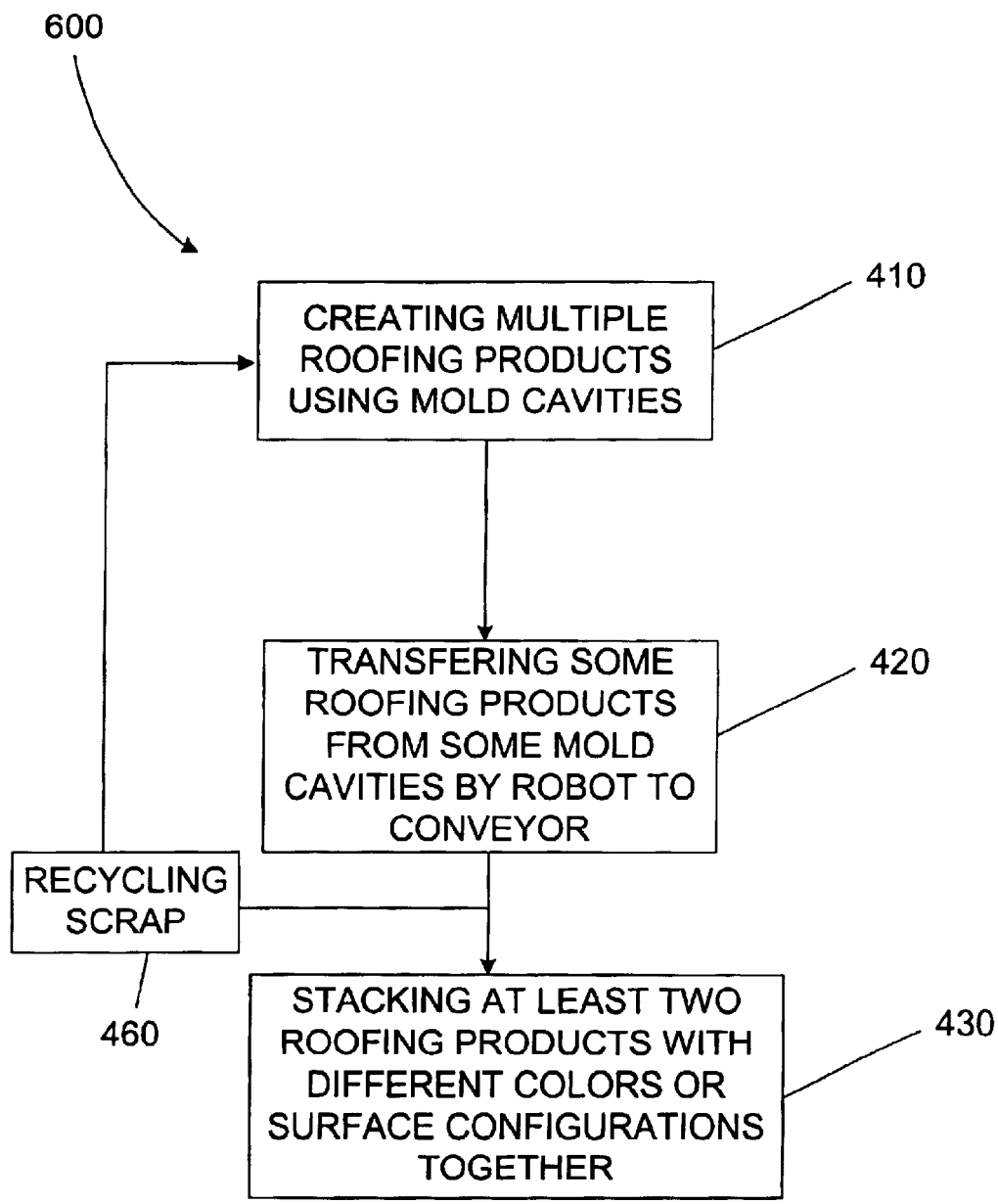

Recycling of scrap material (i.e., step 460 of method 600 shown in FIG. 10) may also be started at this point. One way of recycling scrap involves another conveyor, such as conveyor 37 (which may be a TEC Classic Steel Horizontal Conveyors available from TEC Engineering), positioned along the path accessible on beam 361 by robot 360. As robot 360 travels along its beam, it may stop at conveyor 37, break off any runner attached to the finished product it is transporting, and place that runner or other scrap material onto conveyor 37. Conveyor 37 may then transport that scrap material to a grinder 370 (e.g., Rapid Granulator Model R-36, available from Rapid Granulator, Inc. in Rockford, Ill.). After the scrap material is ground using grinder 370, it may be transported by vacuum to a storage bin 372, which may store the ground scrap for use at an appropriate future time. At the desired time, which may be preset as part of an automated process, the ground material may be transported from the bin to a blender 374 in any suitable manner, such as by vacuum. Blender 374 may then re-mix the ground scrap with any other desired materials and deposit mixture back into the feed throats of one or more of the injection molders 330.

A suitable robot for use as robot 360 is the Sailor model RZ-300N2S-M3L (available from Sailor USA Inc., Kennesaw, Ga.). Although not shown with a cooling station or stations such as those described above, conveyor belts 30 may be equipped with such cooling stations in order to cool the roofing products placed on conveyor belts 30 by robots 360.

Each injection molder 330 may be configured to product finished roofing products of a certain color. The mold cavity or cavities 340 in each injection molder 330 will produce the same colored roofing products as a result. Different injection molders may be configured to produce roofing products with different colors.

After step 420, at some point, at least two roofing products with either different colors or different surface configurations will be positioned beside each other on a conveyor belt 30. By different colors we mean two colors that have different hues, different values, or different chroma on the Munsell scale. Our use of "different" in the terms "different colors" and "different surface configurations" does not include those differences due to chance. The differences to which we refer are those that are purposefully created.

Such different products will then travel along conveyor belts 30 to station 190, where step 430 may be carried out. Step 430 is stacking together at least two of the roofing products that have different colors or different surface configurations. Two such stacks are represented in FIG. 7 as elements 376. Of course, more than two roofing products may be included in such a stack; however, at least two of them must have different colors or different surface configurations.

Figure 9A:
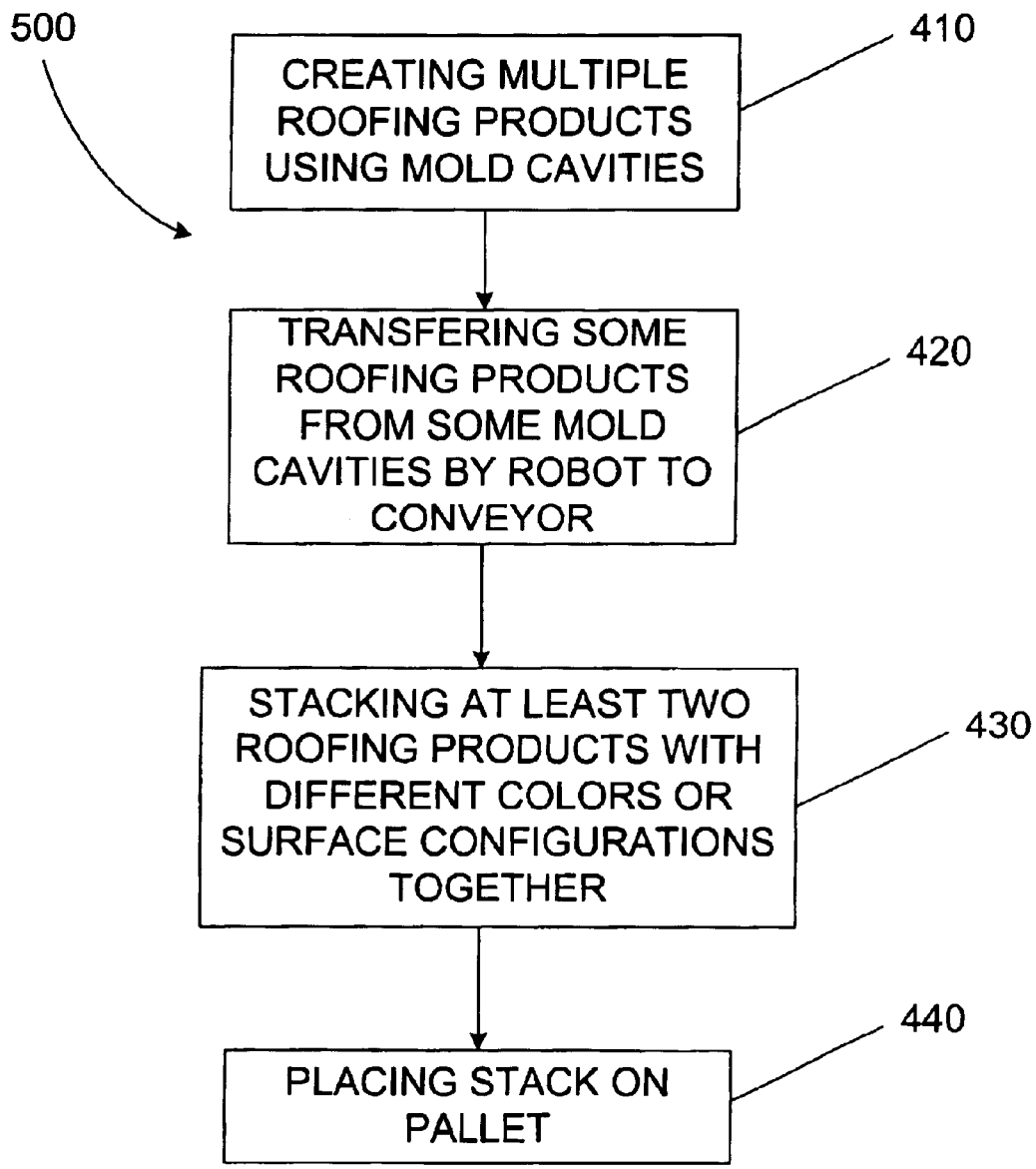
Figure 9B:
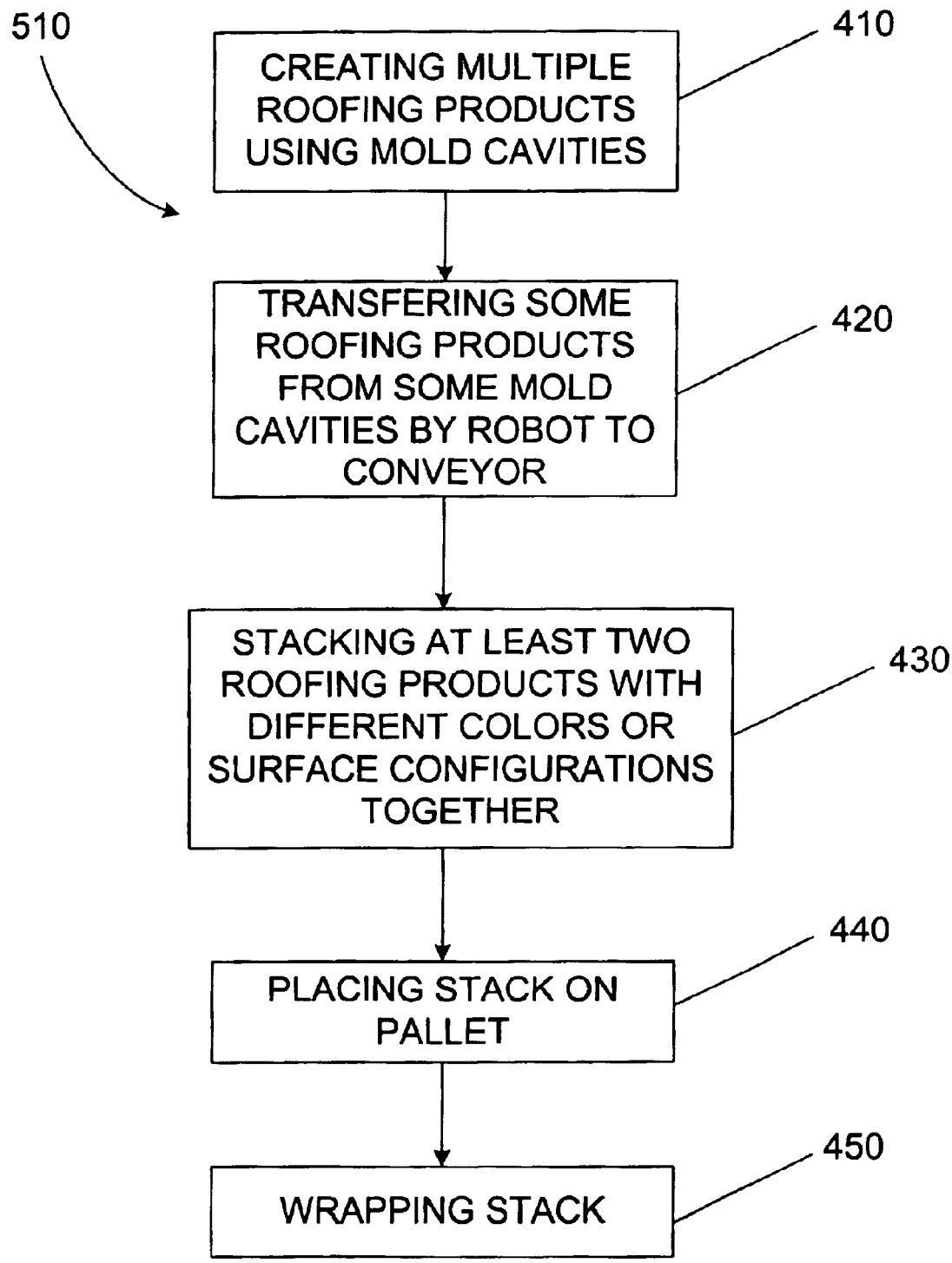

Another of the present methods, method 500 illustrated in FIG. 9A, involves additional use of, for example, station 190. In addition to steps 410–430, method 500 includes taking the stack created through step 430 and placing the stack on a pallet (step 440). Method 510 shown in FIG. 9B includes steps 410–440 of method 500, and additional step 450 of wrapping the stack. Method 520 shown in FIG. 9C includes steps 410–450 of method 510, and the additional step 445 of placing a strap around the stack, which as described below may take place prior to the wrapping of the stack. As in the case of steps 292, 294, and 296 discussed above, the stacking, placing, strapping and wrapping steps of methods 500–520 may be accomplished using an automated procedure, as this phrase was defined above.

Figure 9C:
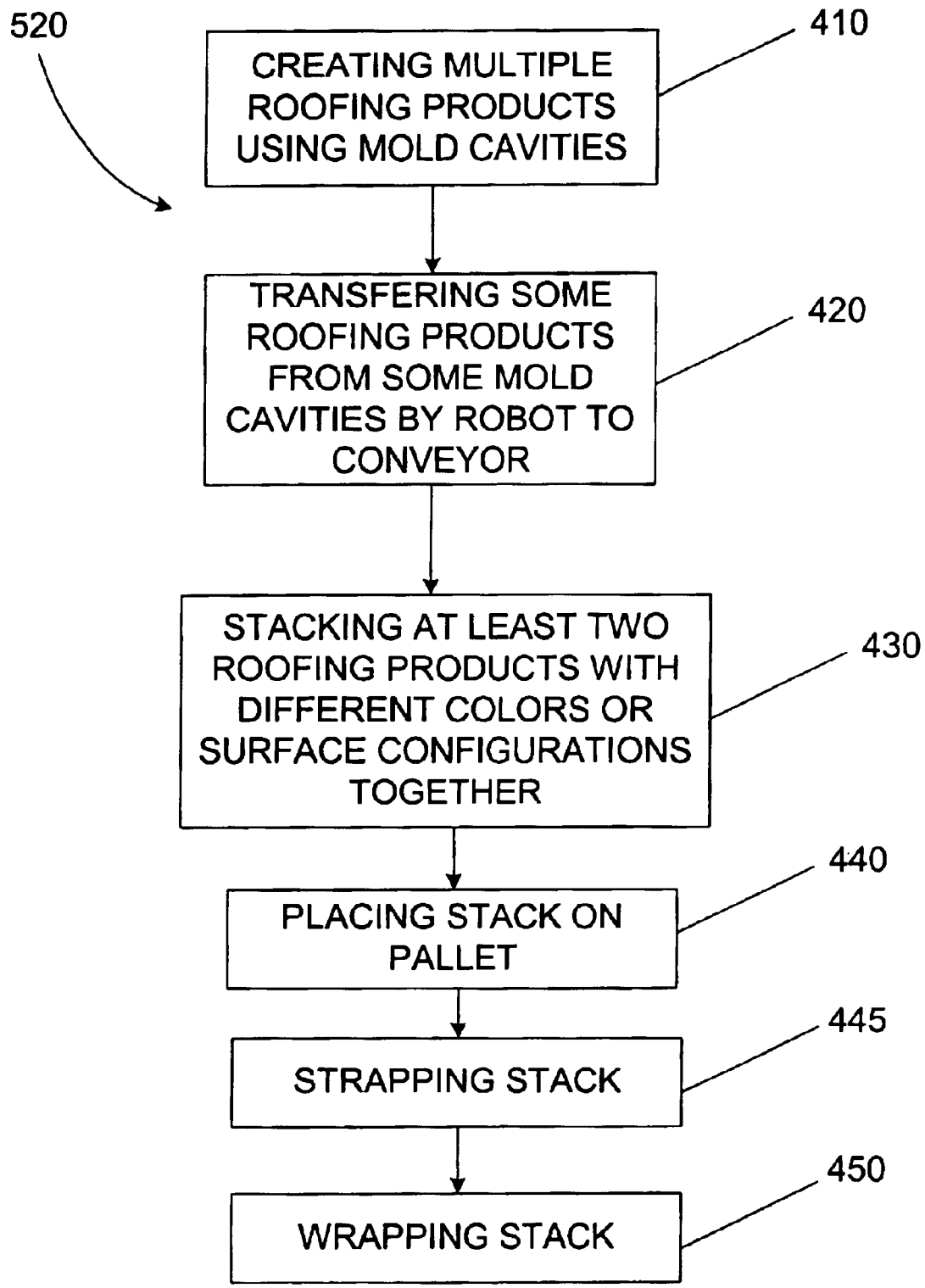

Returning to FIG. 7, one example of the equipment (represented by block diagrams) that may be used for station 190 to accomplish one or more of steps 430, 440, 445, and 450 of FIGS. 8–9C is shown. As FIG. 7 shows, each conveyor 30 may be linked to a variable speed conveyor 31 (e.g., available from Van Pak Corporation, Maryland Heights, Mo.). Each variable speed conveyor 31 carries the roofing products to a stacker 150. The speed of variable speed conveyor 31 may be set with respect to the speed of conveyor 30 so as to create space between the parts as they are delivered to the stacker 150. An example of a suitable stacker is a Van Pak Vertical Stacker (aka a Lowerator) from the Van Pak Corporation (Maryland Heights, Mo.). Stacker 150 stacks multiple finished roofing products (e.g., up to 15). Stacker 150 may be configured to carry out step 430 of stacking at least two roofing products with different colors or surface configurations together to create stack 376. The number of stackers 150 used will depend on the number of incoming conveyors 30—generally, there is a one-to-one correspondence.

As shown in FIG. 7, each stacker 150 may be provided with a queuing station 151 into which stacks 376 are inserted. Stacker 150 may then index downwardly and deliver a given stack 376 onto another conveyor 152 that transports the stack to a strapper 154. Suitable conveyors for conveyor 152 are available from the Van Pak Corporation.

Strapper 154 may be configured to carry out step 445 by placing one or more straps around stack 376. Using straps helps ensure that the roofing products become and remain aligned with each other. For example, strapper 154 may be configured to strap stack 376 across the width of the roofing products. The strapped stack may then be ejected from strapper 154 onto a conveyor 32 equipped with a turning cross (represented by an "X") (such a conveyor is also available from the Van Pack Corporation). Conveyor 32 may be configured to rotate a strapped stack 90 degrees and return the rotated stack to strapper 154 to be strapped again (e.g., across the length of the roofing products). A suitable strapper for use as strapper 154 is an EAM Mosca Model TR3C 700/550 in-line strapping machine (available from EAM-Mosca Corporation, West Hazleton, Pa.). Such a strapping machine may be altered from its stock condition to include guides and stops configured so as to position the stacks in the proper location for the strapping to take place.

Alternatively, conveyor 32 may be configured to advance the strapped stack 376 to a palletizer 160. Queuing stations 156 may be provided as a part of conveyors 32 or as part of palletizer 160. These queuing stations are configured to queue strapped stacks 376 prior to the palletizing of the stacks.

An example of a suitable palletizer for use as palletizer 160 is the Series 2000 Gantry Palletizer available from the Van Pak Corporation.

Palletizer 160 may be equipped with one or more loading stations 158 for stacking bundles (e.g., strapped stacks 376) on one or more pallets, which may be made of wood. This process may be used to accomplish step 440 of placing a stack on a pallet. Palletizer 160 may be equipped with a gantry-style robot to pick up an incoming bundle with vacuum cups and deliver it to a pallet on one of the loading stations 158. The robot may be configured to place bundles on a pallet in multiple orientations to best ensure that the pallet is mechanically stable. For example, the robot may be configured to rotate a bundle placed on top of another bundle by 90°.

Once a pallet has been loaded with bundles (e.g., a given pallet on palletizer 160 may be configured to hold 10 rows of bundles, and each row may include 6 bundles), the loaded pallet may be ejected from the loading station by a powered chain conveyor 162 (available from the Van Pak Corporation) and delivered by a shuttle conveyor and dual conveyor shuttle car system 165, which are available from the Van Pak Corporation. Shuttle conveyor and dual conveyor shuttle car system 165 may be configured to accept loaded pallets from palletizer 160 and deliver them to wrapping station 167. The process for this transfer of the loaded pallets from the palletizer to the wrapping station involves the dual shuttle car shifting on its shuttle conveyor to align with the loading station that is ready to deliver a loaded pallet, accepting that loaded pallet, and then shifting along its shuttle conveyor to align with power chain conveyor 38, which communicates with wrapping station 167. Empty pallets may be loaded into one or more pallet dispensers 169, which can then transfer the empty pallets back to one or more loading stations 158 for use by palletizer 160.

The wrapping step (450) of the present injection molding methods may be carried out at, for example, wrapping station 167, which may include a stretch wrapper 171, such as the model FA-66 Orion Automatic Stretch Wrapping Machine having a heat seal option (available from Orion Packaging Systems, Inc. in Collierville, Tenn.). Wrapping film made be fed to stretch wrapper 171 from its supply wheel 173. Loaded pallets are then wrapped (e.g., stretch wrapped) using stretch wrapper 171. The wrapped pallet may then be ejected onto a powered chain conveyor (available from the Van Pak Corporation) and queued. A lift truck 175 may then take the wrapped pallet to storage.

Some or all of the steps of methods 400, 500, and 600 may be performed using an automated procedure, as "automated procedure" was defined above. Step 410 of creating multiple roofing products using mold cavities will, when using an automated procedure, be understood not to exclude steps that involve human intervention to place starting materials in the appropriate locations from which the remainder of the creating can occur.

The purpose of stacking together different roofing products with different colors (not different colors within a given roofing product, but different colors of different roofing products) or different surface configurations is to provide builders/roofers with the option of easily applying such differently-colored or configured roofing products to a single roof. This is an attractive option where the different colors differ by chroma or value. The convenience of not needing to mix the roofing products from one pallet with the roofing products of another product on site in order to achieve a multi-colored roof or a roof that includes roofing products with different textures is one that is not enjoyed in the prior art.

The steps of the present methods need not be carried out exactly as described above to fall within the scope of the claims and their equivalents. For example, the cooling of the sheet may be carried out using pressurized air, as opposed to pressurized water or ambient air.

The claims are not to be interpreted as including means-plus- or step-plus-function limitations, unless such a limitation is explicitly recited in a given claim using the phrase(s) "means for" or "step for," respectively.

We claim:

1. A method of making roofing products comprising:
   (a) creating a mixture having a filler and a polymer;
   (b) forming a sheet from the mixture;
   (c) cooling the sheet;
   (d) embossing the sheet;
   (e) forming multiple roofing products from the sheet; and
   (f) bundling at least some of the roofing products; where (a)–(f) are performed using an automated procedure and where (a)–(f) are performed in the order presented.

2. The method of claim 1, where (f) comprises:
   (g) stacking at least some of the roofing products to form a stack;
   (h) placing the stack on a pallet; and
   (i) wrapping the stack; where (g)–(i) are performed using an automated procedure.

3. The method of claim 2, where (f) further includes:
   (j) placing a strap around the stack; and where (g)–(j) are performed using an automated procedure.

4. The method of claim 1, wherein the step of forming multiple roofing products from the sheet comprises forming multiple roofing products by cutting the sheet.

* * * * *